United States Patent [19]
Dietle et al.

[11] Patent Number: 6,036,192
[45] Date of Patent: Mar. 14, 2000

[54] SKEW AND TWIST RESISTANT HYDRODYNAMIC ROTARY SHAFT SEAL

[75] Inventors: Lannie Dietle, Sugar Land; Manmohan Singh Kalsi, Houston, both of Tex.

[73] Assignee: Kalsi Engineering, Inc., Sugar Land, Tex.

[21] Appl. No.: 09/250,528

[22] Filed: Feb. 16, 1999

Related U.S. Application Data

[62] Division of application No. 08/927,960, Sep. 11, 1997, Pat. No. 5,873,576, which is a continuation of application No. 08/495,272, Jun. 27, 1995, abandoned.

[51] Int. Cl.[7] ............................................. F16J 15/16
[52] U.S. Cl. ........................... 277/559; 277/568; 277/587
[58] Field of Search .................................. 277/559, 562, 277/568, 549, 560, 572, 587

[56] References Cited

U.S. PATENT DOCUMENTS

| | | | |
|---|---|---|---|
| 2,188,857 | 1/1940 | Chievitz | 277/559 |
| 3,497,225 | 2/1970 | Workman | 277/559 |
| 3,729,204 | 4/1973 | Augustin | 277/559 |
| 3,744,805 | 7/1973 | Heinrich . | |
| 4,288,083 | 9/1981 | Braconier . | |
| 4,484,753 | 11/1984 | Kalsi . | |
| 4,531,747 | 7/1985 | Miura | 277/568 |
| 4,610,319 | 9/1986 | Kalsi . | |
| 4,619,534 | 10/1986 | Daly et al. . | |
| 4,770,548 | 9/1988 | Otto | 277/552 |
| 5,137,285 | 8/1992 | Pick | 277/562 |
| 5,195,757 | 3/1993 | Dahll . | |
| 5,230,520 | 7/1993 | Dietle et al. . | |
| 5,328,178 | 7/1994 | Nies | 277/215 |
| 5,678,829 | 10/1997 | Kalsi et al. . | |
| 5,738,358 | 4/1998 | Kalsi et al. . | |
| 5,763,956 | 6/1998 | Metz et al. . | |
| 5,873,576 | 2/1999 | Dietle et al. . | |

FOREIGN PATENT DOCUMENTS

| | | |
|---|---|---|
| 0030085 | 6/1981 | European Pat. Off. . |
| 0860351 | 8/1998 | European Pat. Off. . |
| 499480 | 1/1939 | United Kingdom . |
| 95/03504 | 2/1995 | WIPO . |
| 97/01721 | 1/1997 | WIPO . |
| 97/24540 | 7/1997 | WIPO . |
| 98/37341 | 8/1998 | WIPO . |

OTHER PUBLICATIONS

Langford, J., and Kalsi, M.S. "A New Hydrodynamically Lubricated Bearing Seal for Improving Rock Bit Performance." pp 1–8, vol. 27, Drilling Technology Symposium; American Society of Mechanical Engineers, Book No. G00508–1990.

Horve, Leslie A. "Shaft Seals for Dynamic Applications", pp 338–339; Marcel Dekker, Inc., 1996.

Ayala, Hugo M., et al. "Seal Design for Reduced Wear in Abrasive Slurries." pp 1–17, FEDSM97–3446; Fluids Engineering Division Summer Meeting, American Society of Mechanical Engineers, Jun. 22–26, 1997.

Ayala, Hugo M., et al. "Wear of Elastomeric Seals in Abrasive Slurries", pp 9–21, Wear 220 (1998) Elsevier Science S.A., Aug. 28, 1997.

*Primary Examiner*—Daniel G. DePumpo
*Attorney, Agent, or Firm*—James L. Jackson; Mayor, Day, Caldwell & Keeton LLP.

[57] ABSTRACT

A hydrodynamically lubricated squeeze packing type rotary shaft seal suitable for lubricant retention and environmental exclusion which incorporates one or more resilient protuberances which and cooperate with the gland walls to hold the seal straight in its installation groove in unpressurized and low pressure lubricant retention applications thereby preventing skew-induced wear caused by impingement of abrasive contaminants present in the environment, and which also serve as radial bearings to prevent tipping of the seal within its installation gland. Compared to prior art, this invention provides a dramatic reduction of seal and shaft wear in abrasive environments and provides a significant increase in seal life.

24 Claims, 3 Drawing Sheets

SKEW AND TWIST RESISTANT HYDRODYNAMIC ROTARY SHAFT SEAL

This is a divisional of Ser. No. 08/927,960, U.S. Pat. No. 5,873,576, filed Sept. 11, 1997 which is a continuation of Ser. No. 08/495,272 filed Jun. 27, 1995 now abandoned.

FIELD OF THE INVENTION

This invention relates generally to rotary seals such as rotary shaft seals for establishing a seal between a relatively rotating surface and a housing within which the relatively rotating surface is located. More specifically the present invention concerns ring-like rotary seals of the squeeze packing type which composed of elastomeric sealing material which are contained within seal grooves and provide a seal geometry that provides for resistance to becoming skewed or twisted within the seal groove. This skew and twist resistant seal may also take the form of a hydrodynamic seal which wedges a lubricant film between the seal and the relatively rotating surface to inhibit seal wear and to exclude contaminants from the dynamic sealing interface.

Although the present invention is discussed herein particularly as it relates to shaft seals, such is not to be considered limiting of the scope of the invention. The invention also has application to other types of dynamic seals as well.

BACKGROUND OF THE INVENTION

Industry has found many uses for the hydrodynamically lubricated, ring shaped squeeze packing type rotary shaft seals embodying the principles set forth in U.S. Pat. Nos. 4,610,319 and 5,230,520 and marketed by Kalsi Engineering, Inc. of Sugar Land, Tex. under the registered trademark, Kalsi Seals®. Kalsi Seals are used to provide lubricant retention and contaminant exclusion in harsh abrasive environments, such as the downhole oil field drilling environment. Present commercial oil field applications include rotary cone rock bits, mud motors, high speed coring swivels, and rotating drilling heads. All references herein to hydrodynamically lubricated seals or hydrodynamic seals are directed to seals embodying the principles of the above identified U.S. Patents.

FIGS. 1, 2, 2A and 3 of this specification represent Kalsi Seals prior art which is discussed herein to enhance the readers' understanding of the distinction between the prior art seals and the present invention.

Figure 1:
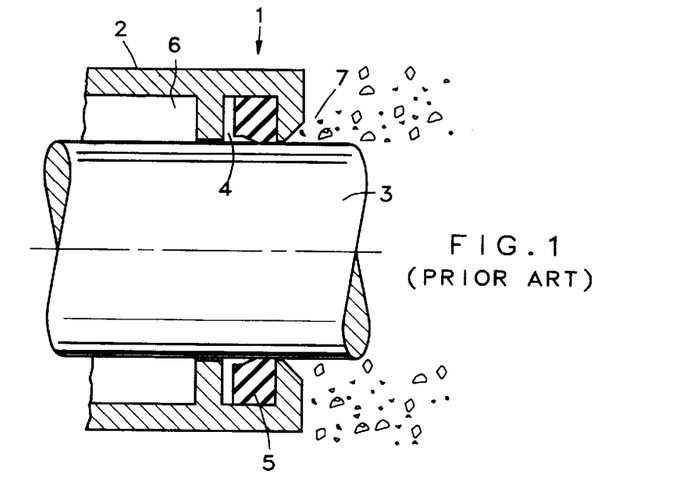
FIG. 1 is a partial cross-sectional illustration of a housing and rotary shaft arrangement incorporating a hydrodynamic seal representative of the prior art.

Referring now to the prior art of FIG. 1 there is shown a cross-sectional view of a hydrodynamically lubricated squeeze packing type rotary shaft sealing assembly generally at 1 including a housing 2 from which extends a rotary shaft 3. The housing defines an internal seal installation groove, seat or gland 4 within which is located a ring shaped hydrodynamic rotary shaft seal 5 which is constructed in accordance with the principles of the above mentioned patents and which is shown in greater detail in the partial sectional views of FIGS. 2 and 2A.

Figure 2:
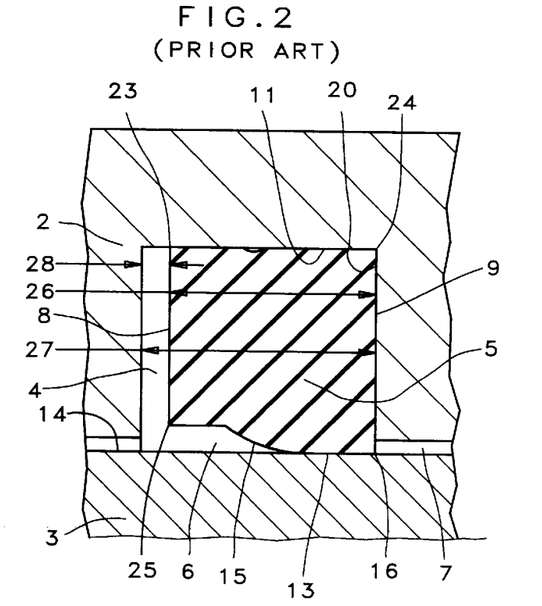
FIGS. 2 and 2A are fragmentary sectional views of a general purpose hydrodynamic seal representing the prior art and shown in FIG. 2 to be located in radially compressed condition within a sealing gland and establishing hydrodynamic sealing engagement with a rotary shaft; the seal being shown in the uncompressed condition thereof in FIG. 2A.
Figure 2A:
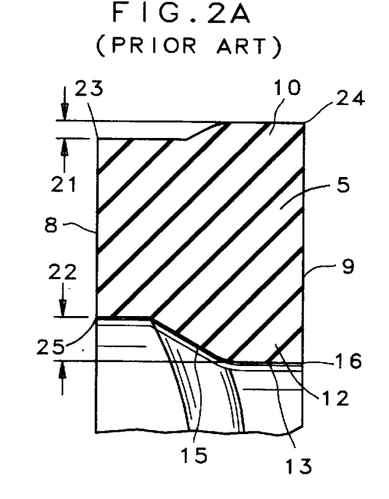
Figure 3:
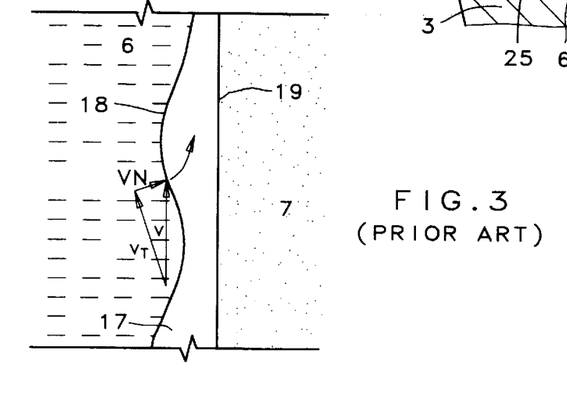
FIG. 3 is a flat development which represents the configuration of the sealing interface of a prior art hydrodynamic seal and which illustrates the theoretical generation of the hydrodynamic wedging or pumping action thereof.

FIG. 2 represents the cross-sectional configuration of the prior art seal 5 when located within its seal groove and radially compressed between the rotary shaft and the radially outer wall of the seal groove, and FIG. 2A represents the radially uncompressed cross-sectional shape of the prior art seal.

The hydrodynamic seal is used to separate the lubricant 6 from the environment 7, and to prevent intermixing of the lubricant and the contaminant matter present within the environment. The environment usually contains highly abrasive particulate matter within a liquid vehicle; an example of such an environment would be oil field drilling fluid. From an overall orientation standpoint, the end of the seal which is oriented toward the lubricant is surface 8 and the end of the seal which is oriented toward the environment 7 is surface 9.

When the seal 5 is installed in the circular seal groove or seat 4, a circular radially protruding static sealing lip 10 is compressed against a counter-surface 11 of the groove per the teachings of U.S. Pat. No. 5,230,520. At the inner periphery of the circular sealing element 5 there is provided an inner circumferential sealing lip 12 that defines a dynamic sealing surface 13 that is compressed against a counter-surface 14 of the rotatable shaft 3. The circular seat or seal groove 4 is sized to hold the resilient circular sealing element 5 in radial compression against the cylindrical sealing surface 14 of the shaft 3, thereby initiating a static seal with the housing and shaft in the same manner as any conventional squeeze packing seal, such as an 0-Ring. When shaft rotation is not present, a liquid tight seal is maintained at the static sealing interface between the static sealing lip 10 and the mating counter-surface 11 of the seat, and between the dynamic sealing lip 12 and the counter-surface 14 of the shaft.

When shaft rotation takes place, the hydrodynamic seal remains stationary with respect to the housing, and maintains a static sealing interface with said housing, while the seal-to-shaft interface becomes a dynamic sealing interface. The inner peripheral surface of the hydrodynamic seal inner lip 12 incorporates a geometry that promotes long seal life by hydrodynamically lubricating the dynamic seal-to-shaft interfacial zone, and by excluding environmental contaminates from the seal to shaft interface. The inner peripheral hydrodynamic seal lip 12 incorporates a wavy, axially varying edge 15 on its lubricant side, and a straight, sharp edge 16 on its environmental side. The radial cross-section of FIGS. 2 and 2A is taken at a circumferential location which represents the average width of the dynamic sealing lip. As relative rotation of the shaft takes place, the wavy, axially varying edge 15 on the lubricant side of the dynamic sealing lip, which has a gradually converging relationship with the shaft in the axial and circumferential directions, generates a hydrodynamic wedging action that introduces a lubricant film between the seal inner surface 13 and the counter-surface 14 of the shaft per the teachings of U.S. Pat. No. 4,610,319. This lubricant film physically separates the seal and the shaft, and thereby prevents the typical dry rubbing type wear associated with conventional non-hydrodynamic squeeze packing type seals, and thereby prolongs seal and mating shaft surface life and makes higher service pressures practical. This hydrodynamic action, which is described in detail in U.S. Pat. No. 4,610,319, can more easily be understood by referring to FIG. 3, which shows a flat development of the cylindrical sealing surface 14 of the shaft, and which depicts the footprint of the dynamic inner lip 12 of the seal against the sealing surface 14 of the shaft. From an orientation standpoint, the lubricant is shown at 6, the seal footprint is shown at 17, and the environment is shown at 7. The lubricant side of the footprint has a wavy edge 18 created by the wavy edge 15 of the seal, and the mud side of the footprint has a straight edge 19 created by the sharp circular corner 16 of the seal. The lubricant is pumped into the dynamic sealing interface by the normal component $V_N$ of the rotational velocity V.

Referring again to FIG. 2 and FIG. 2A, the sharp circular corner 16 of the environmental side of the seal is not axially varying, and does not generate a hydrodynamic wedging action with the environment in response to relative rotary motion, and thereby functions to exclude particulate contaminants from the seal-to-shaft interface per the teachings of U.S. Pat. No. 4,610,319. Slight axial shaft motions occur in many types of rotating machinery due to component flexibility and various internal clearances. The sharp corner 16, which is commonly known as the exclusion side or exclusion edge, excludes contaminants by performing a shaft scraping function during such axial shaft motions. Thus, as relative axial movement occurs between the shaft and seal, accumulated contaminants are scraped from the sealing surface of the shaft so that the dynamic sealing interface remains free of contaminants. This exclusionary action is described in detail in U.S. Pat. No. 4,610,319.

The illustration of FIGS. 2 and 2A illustrates the customary type of general purpose Kalsi Seals rotary shaft seal that positions and configures the exclusionary edge 16 and the environmental end 9 of the seal 5 in such a manner that they are largely supported by the gland wall 20 in a manner that resists distortion and extrusion of seal material in those instances when the seal is subjected to the hydrostatic force resulting from the lubricant pressure acting over the area between the static sealing interface and the dynamic sealing interface. Such force occurs when the lubricant pressure is higher than the environment pressure. FIGS. 1, 2 and 2A show the seal being forced against the gland wall 20 by hydrostatic force resulting from the lubricant pressure acting over the area between the static sealing interface and the dynamic sealing interface.

The projection 21 of the static sealing lip is typically less than or equal to one-half of the nominal radial compression so that most or all of the seal surface from circular corner 23 to circular corner 24 is brought into close proximity or direct contact with the mating counter-surface 11 of the seating groove when the seal is compressed. The close proximity and/or contact between the seal and the seat groove in the general vicinity of circular corner 23 provides stability against clockwise twisting of the seal within the gland, with the clockwise direction being visualized with respect to FIG. 2. This seal stabilization feature is important in implementations where a hydrostatic and/or mechanical force is applied to the environmental end 9 of the seal, such as during transient pressure fluctuations or when the dynamic sealing interface exclusionary edge 16 is required to actively scrape contaminants off of an axially moving shaft. The projection 22 of the dynamic sealing lip 12 is substantially greater than one-half of the nominal radial compression of the seal so that the seal surface at the radially inner circular corner 25 is not brought into contact with the relatively rotating counter-surface 14, and so that the angulated, axially varying hydrodynamic inlet geometry 15 is not overly flattened against the relatively rotating counter-surface so that the intended hydrodynamic wedging of lubricant into the dynamic sealing interface is not impeded by any undesirable gross distortion of the hydrodynamic geometry.

The static sealing lip 10 has generally the same cross-sectional geometry as the average cross-sectional configuration of the dynamic sealing lip 12 except that it is shorter; therefore when the seal is compressed, the interfacial contact force profiles and deformation of the two lips are very similar in both magnitude and location, and as a result, there is no gross tendency for the seal to twist within the gland. This means that the abrupt sharp edge 16 remains compressed firmly against the shaft, and can perform its intended scraping and exclusionary function so that contaminants from the environment do not enter the dynamic sealing interface.

DESCRIPTION OF THE PROBLEM

Referring again to FIG. 2, the installed axial length 26 of the seal can vary considerably due to a number of factors, including tolerances, variations in radial compression, and differential thermal expansion, as will be described in detail immediately here-after.

Firstly, the manufacturing tolerance on the length of the seal contributes directly to variations in the installed axial length 26 of the seal.

Secondly, radial compression of the seal causes a corresponding volume of material to be displaced axially, resulting in a length increase to the seal. The manufacturing tolerance of the housing groove diameter, of the shaft sealing diameter, and of the seal radial cross-section all cause variations in radial compression of the seal. Lateral offset of the shaft with respect to the housing due to bearing clearance and elastic shaft deflection also causes variations in radial compression of the seal. Such unavoidable variations in radial compression contribute significantly to variations in the installed axial length 26 of the seal.

Thirdly, the coefficient of thermal expansion of the elastomeric sealing element is usually about 10 times greater than that of the housing and shaft, which are usually made from metal. The seal is often used in an elevated temperature environment, and also generates its own heat due to lubricant shear and asperity contact in the dynamic sealing interface. The seal experiences volumetric thermal expansion (which is about triple the linear coefficient of thermal expansion), but is confined radially and circumferentially, so most of the thermal expansion is relieved axially, which contributes significantly to variations in the installed axial length 26 of the seal.

All of the above mentioned factors can make the installed width of the seal difficult to predict accurately, and in fact even makes the width vary from one circumferential location to another. The gland length 27 is therefore designed to accommodate the worst case installed seal length so that the gland cannot become overfilled, which could cause dramatically increased interfacial contact pressure, which could in turn damage the dynamic sealing lip due to impairment of the hydrodynamic film, and due to the resulting wear and increased local temperature. Under all operating conditions there is by design sufficient axial clearance 28 between the seal and the gland so as to avoid overfilling of the gland.

In the uncompressed state of the seal 5, the outer diameter of the static sealing lip 10 is a larger diameter than the mating counter-surface 11 of the installation groove so that radial compression occurs at the time of assembly as intended. The diametric difference between the static lip 10 of the seal and the mating counter-surface 11 of the groove also causes the seal to undergo circumferential compression at the time of installation, as well as the intended radial compression. This circumferential compression causes troublesome secondary effects, as will be described in detail here-after.

If the seal were unrestrained by the gland, the volumetric thermal expansion of the seal at service temperatures would cause the circumference of the seal to grow considerably. For example, with the elastoiter HSN which has a coefficient of linear thermal expansion of 0.000093 inches per inch per degree f, the unrestrained circumference would grow by about 2.15% with a temperature increase of 230° f. When the seal is constrained by the gland, as it is in actual service, the circumferential thermal expansion has the effect of placing the seal under additional circumferential compression.

Since the circumference of the seal is relatively long in comparison to the cross-section of the seal, the load imposed by the installation and thermal expansion imposed circumferential compression can cause the seal to bend or buckle within the clearance 28 between the seal and the gland in a manner similar to the classic textbook example of the bending or buckling of a long, slender structural column under compressive loading.

When the pressure of the lubricant 6 is higher than that of the environment 7, the hydrostatic pressure of the lubricant forces the environmental end 9 of the seal against the gland wall 20 and supports the seal against the above described circumferential compression-induced buckling, and the exclusionary edge 16 is held in the intended non-axially varying position and therefore does not generate a hydrodynamic wedging action with the environment in response to relative rotary motion, and thereby functions as intended to exclude particulate contaminants from the seal-to-shaft interface.

When the pressure of the lubricant 6 is substantially the same as that of the environment 7, little or no hydrostatic pressure is present to support the seal against the above described circumferential compression induced buckling, and bucking will occur if friction between the static sealing lip 10 and the mating counter-surface 11 of the groove is insufficient to prevent said buckling. (The well lubricated interface between the dynamic sealing lip and the shaft counter-surface provides little or no resistance to buckling.)

When buckling occurs, the exclusionary edge 16 assumes an unintended skewed, axially varying position within the gland and therefore can generate an unintended hydrodynamic wedging action with the environment in response to relative rotary motion, which can sweep particulate contaminants into the seal-to-shaft interface and cause abrasive wear of the seal and shaft. Under ideal conditions the hydrodynamic wedging action of the exclusionary edge 16 is still minimal when buckling occurs because of the scraping action provided by the abrupt shape of the exclusionary edge, and because of the corresponding high interfacial contact pressure that occurs between the seal and the shaft at the exclusionary edge which creates conditions which are less than ideal for the generation of a hydrodynamic wedging action. In some cases, however, the compression induced buckling of the seal can also cause the buckled portion of the seal to twist within the gland in a counter-clockwise direction (as visualized with respect to FIG. 2) causing the sharp edge of the seal to be tilted away from the shaft so that the buckled portion of the seal has a gradually converging relationship with the shaft (rather than an abrupt relationship) which, in conjunction with the buckling-induced axial variation, is eminently suitable for the generation of a hydrodynamic wedging action in response to relative rotation of the shaft which can force contaminants into the seal-to-shaft interface and cause rapid abrasive wear of the seal and shaft.

SUMMARY OF THE INVENTION

The present invention is a hydrodynamically lubricated, squeeze packing type rotary shaft seal which overcomes the buckling-induced abrasive wear problem previously enumerated. The hydrodynamic rotary shaft seal of this invention is provided with an axially varying shape on the lubricant side of the dynamic sealing interface for the purpose of hydrodynamic lubrication of the dynamic sealing interface, and has a straight; sharp-cornered non-axially varying exclusionary shape on the environmental side of the dynamic sealing interface for the purpose of excluding contaminants. More specifically, the hydrodynamic seal of this invention is an evolutionary improvement to the commercially available type of hydrodynamic rotary shaft seal which is manufactured and sold by Kalsi Engineering, Inc. of Sugar Land, Tex. under U.S. Pat. Nos. 4,610,319 and 5,230,520.

The present invention improves the environmental exclusion performance of the aforementioned type of hydrodynamic seal when the seal is used in unpressurized or low pressure lubricant retention applications in abrasive environments. The improvement is accomplished by eliminating the currently experienced and above described compression-induced buckling action and the sometimes-concurrent twisting action which can generate an unintended hydrodynamic wedging action with the environment in response to relative rotary motion and sweep particulate contaminants into the seal-to-shaft interface and cause abrasive wear of the seal and shaft. The improved performance of the exclusionary feature of the seal results in substantially increased sealing life when the seal is used for unpressurized or low pressure lubricant retention applications in abrasive environments.

The invention s a hydrodynamically lubricated, squeeze packing type rotary shaft seal which incorporates one or more resilient protuberances that serve as axial compression springs and cooperate with the gland walls to hold the seal straight in its installation groove in unpressurized and low pressure lubricant retention applications, thereby preventing skew-induced wear caused by impingement of abrasive contaminants present in the environment, and which also incorporates one or more integrally molded hydrodynamically lubricated bearings that support the seal against twisting. These features cooperate to prevent the previously described circumferential compression-induced buckling and twisting of the seal that can lead to premature abrasive wear of the seal and shaft.

BRIEF DESCRIPTION OF THE DRAWINGS

So that the manner in which the above recited features, advantages, and objects of the present invention are attained and can be understood in detail, a more particular description of the invention, briefly summarized above, may be had by reference to the embodiments thereof which are illustrated in the appended drawings.

It is to be noted, however, that the appended drawings only illustrate typical embodiments of this invention, and are therefore not to be considered limiting of its scope, for the invention may admit to other equally effective embodiments.

IN THE DRAWINGS

FIGS. 5A through 10 are fragmentary sectional views of squeeze packing seals representing various alternate embodiments of the present invention being shown in the uncompressed condition thereof.

DETAILED DESCRIPTION OF PREFERRED EMBODIMENT

Figure 4A:
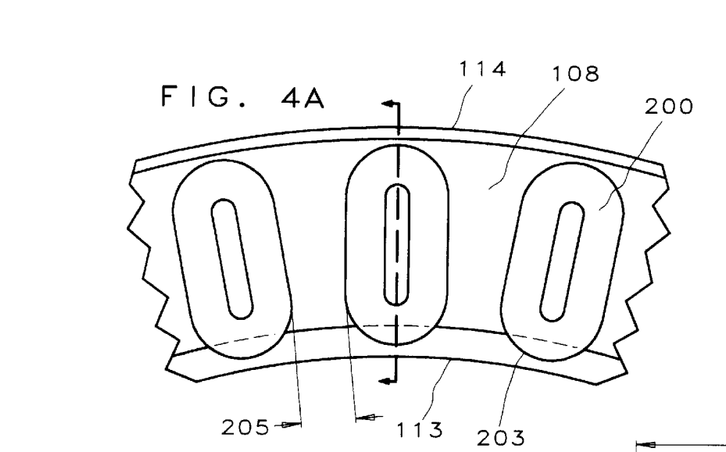
FIGS. 4A, 4B and 4C are fragmentary illustrations of a hydrodynamic rotary shaft seal representing the preferred embodiment of the present invention with the end view 4A and the cross-sectional view FIG. 4B showing the uncompressed condition of the seal, and with the cross-sectional view FIG. 4C illustrating the compressed condition of the seal as installed within a gland and establishing hydrodynamic sealing engagement with a rotary shaft.
Figure 4B:
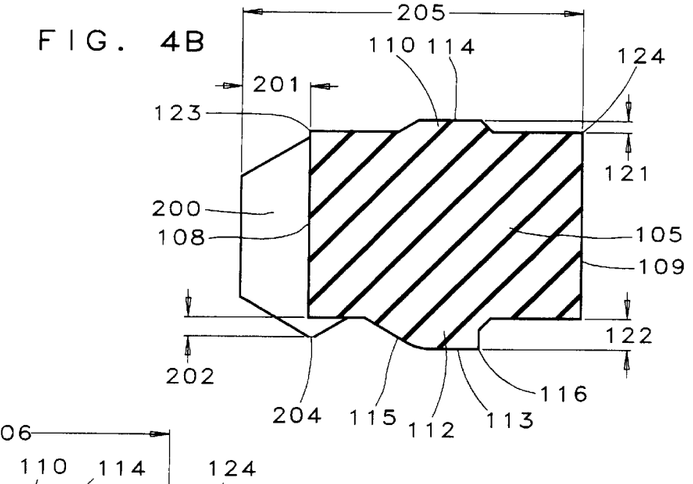
Figure 4C:
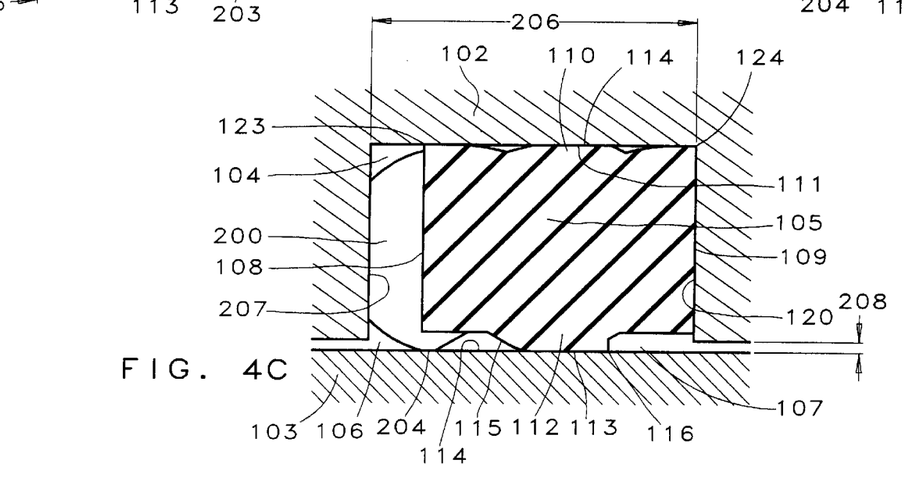

Referring now to the drawings, and specifically to FIGS. 4A, 4B and 4C, there are shown two views that represent the uncompressed configuration of the improved hydrodynamic rotary shaft seal representing the preferred embodiment of this invention, and one view that represents the compressed configuration of the squeeze packing type seal of this invention.

FIG. 4A is a fragmentary end view of the lubricant end of the seal in the uncompressed configuration, and FIG. 4B is a fragmentary cross-sectional view of the seal in the uncompressed configuration. FIGS. 4A and 4B are oriented in third angle projection with respect to one another so that they can be interpreted together by the standard conventions of multi and sectional view orthographic drawing projection practiced in the United States and described in ANSI Y14.3-1975, an Industry Standardization Document promulgated by ASME. Section 3-4.2.1 has been interpreted to mean that the circular body of the seal should be cross-hatched in sectional view, while the protuberances (described below) should be drawn in outline form without cross-hatch lines to avoid conveying a false impression of circumferential solidity.

FIG. 4C is a fragmentary view which represents the cross-sectional configuration of the seal of the present invention when located within its seal groove and radially compressed between the rotary shaft and the radially outer wall of the seal groove under conditions where the lubricant and environment pressures are substantially the same. In FIG. 4C there is shown a cross-sectional view of a sealed rotary shaft assembly including a housing 102 from which extends a rotary shaft 103. The housing defines an internal seal installation groove, seat or gland 104 within which is located a ring shaped hydrodynamic rotary shaft sealing element 105 which is constructed in accordance with the principles of the present invention. The sealing element is a resilient, ring shaped squeeze packing that may be composed of any one of a number of suitable materials including elastomeric or rubber-like sealing material and various polymeric sealing materials, or any suitable combination thereof, including a composite construction where one end of the seal is of a different hardness than the other.

The hydrodynamic seal 105 is used as a partition to separate the lubricant 106 contained within the housing 102 from the environment 107, and to prevent intermixing of the lubricant and the contaminant matter present within the environment. The environment usually contains highly abrasive particulate matter within a liquid vehicle. From an overall orientation standpoint, the end of the circular sealing element 105 which is oriented toward the lubricant is surface 108 and the end of the seal which is oriented toward the environment 107 is surface 109, the inner diameter of the seal is represented at 113, and the outer diameter is represented at 114. The compressed configuration of the seal shown in FIG. 4C is representative of its shape when the lubricant 106 and the environment 107 are at substantially the same pressure.

When the seal 105 is installed in the circular seal groove or seat 104, a circular radially protruding static sealing lip 110 is compressed against a counter-surface 111 of the groove per the teachings of U.S. Pat. No. 5,230,520. At the inner periphery of the circular sealing element 105 there is provided an inner circumferential protuberance 112 that defines a dynamic sealing surface 113 that is compressed against a counter-surface 114 of the rotatable shaft 103. The circular seat or seal groove 104 of the housing 102 is sized to hold the resilient circular sealing element 105 in radial compression against the cylindrical sealing surface 114 of the shaft 103, thereby initiating a static seal with the housing and shaft in the same manner as any conventional squeeze packing seal, such as an 0-Ring. When shaft rotation is not present, a liquid tight seal is maintained at the static sealing interface between the static sealing lip 110 and the mating peripheral counter-surface 111 of the seat, and between the dynamic sealing lip 112 and the counter-surface 114 of the shaft 103.

When shaft rotation takes place, the hydrodynamic seal remains stationary with respect to the housing, and maintains a static sealing interface with said housing, while the seal-to-shaft interface becomes a dynamic sealing interface. The inner peripheral surface of the hydrodynamic seal inner lip 112 incorporates a special patented geometry that promotes long seal life by hydrodynamically lubricating the dynamic seal-to-shaft interfacial zone, and by excluding environmental contaminates from the seal to shaft interface; this special geometry consists of a wavy, axially varying edge 115 on the lubricant side of the lip and a straight, sharp edge 116 on the environmental side of the lip per the teachings of U.S. Pat. No. 4,610,319. FIGS. 4B and 4C are taken at a circumferential location which represents the average interfacial contact width of the dynamic sealing interface, which corresponds to the mid-point in the wave height of the geometry described in U.S. Pat. No. 4,610,319 which generates the lubricant wedging action.

As relative rotation of the shaft takes place, the wavy, axially varying edge 115 on the lubricant side of the lip, which has a gradually converging relationship with the shaft in the axial and circumferential directions, generates a hydrodynamic wedging action that introduces a lubricant film between the seal inner surface 113 and the counter-surface 114 of the shaft per the previously described teachings of U.S. Pat. No. 4,610,319. This lubricant film physically separates the seal and the shaft, and thereby prevents the typical dry rubbing type wear associated with conventional non-hydrodynamic squeeze packing type seals, and thereby prolongs seal and mating shaft surface life and makes higher service pressures practical. The geometry of the hydrodynamic inlet geometry can take any one of many suitable forms that result in a gradually converging, axially varying shape at the lubricant side of the dynamic sealing lip without departing from the spirit or scope of the present invention.

The sharp circular corner 116 of the environmental side of the seal is not axially varying, and does not generate a hydrodynamic wedging action with the environment in response to relative rotary motion, and thereby functions to exclude particulate contaminants from the seal-to-shaft interface per the previously described teachings of U.S. Pat. No. 4,610,319. Slight axial shaft motions occur in many types of rotating machinery due to component flexibility and various internal clearances. The sharp corner 116, which is commonly known as the exclusion side or exclusion edge, excludes contaminants by performing a shaft scraping function during such axial shaft motions. Thus, as relative axial movement occurs between the shaft and seal, accumulated contaminants are scraped from the sealing surface of the shaft so that the dynamic sealing interface remains free of contaminants. This exclusionary action is described in detail in U.S. Pat. No. 4,610,319.

The projection 121 of the static sealing lip is usually less the than or equal to one-half of the nominal radial compression of the seal per the teachings of U.S. Pat. No. 5,230,520 so that most or all of the seal surface from circular corner 123 to circular corner 124 is brought into direct contact or close proximity with the mating counter-surface 111 of the seating groove when the seal is compressed. The close proximity and/or contact between the seal and the seat groove in the general vicinity of circular corner 123 provides stability against clockwise twisting of the seal within the gland, with the clockwise direction being visualized with respect to FIG. 4C. This seal stabilization feature is important in implementations where a hydrostatic and/or mechanical force is applied to the environmental end 109 of the seal, such as during transient pressure fluctuations or when the dynamic sealing interface exclusionary edge 116 is required to actively scrape contaminants off of an axially moving shaft. The projection 122 of the dynamic sealing lip 112 is substantially greater than one-half of the nominal radial compression of the seal per the teachings of U.S. Pat. No. 5,230,520 so that the angulated, axially varying hydrodynamic inlet geometry 115 is not overly flattened against the relatively rotating counter-surface so that the intended hydrodynamic wedging of lubricant into the dynamic sealing interface is not impeded by any undesirable gross distortion of the hydrodynamic geometry. The radially inward projection of lip 112 is shown by dimension 122.

Except for being shorter, the static sealing lip 110 has generally the same cross-sectional geometry as the average cross-sectional configuration of the dynamic sealing lip 112 per the teachings of U.S. Pat. No. 5,230,520; therefore when the seal is compressed, the interfacial contact force profiles and deformation of the two lips are very similar in both magnitude and location and as a result, there is no gross tendency for the seal to twist within the gland due to gross non-symmetric compression.

The principle geometric feature of the present invention is the presence of a plurality of resilient protuberances 200 that serve as compression springs in the axial direction and serve as radial bearings in the radial direction. The protuberances project axially from the circular body of the seal by the axial projection dimension 201 and project radially inward from the circular body of the seal by the radial projection dimension 202.

The magnitude of the radially inward projection 202 of the resilient protuberances 200 is approximately equal to the radially inward projection 122 of the dynamic lip 112 less the nominal compression of lip 112, so that when the seal is compressed within its gland, the radially inward projection is in nominal contact with the relatively rotating counter-surface 114 of the shaft 103 at radial bearing surface 204. Depending on tolerances and lateral offset between the shaft and housing, the positional relationship between the radial bearing surface 204 and the shaft surface 114 may range from slight clearance to slight radial compression. The nominal contact between the radial bearing surface 204 and the shaft provides stability against counter-clockwise twisting of the seal within the gland, with the counter-clockwise direction being visualized with respect to FIG. 4C, so that the abrupt circular exclusionary corner 116 remains in firm contact with the shaft so that it can perform its intended exclusionary function. The radial bearing surface 204 employs a geometry which provides a gently converging relationship with the shaft in the circumferential direction, as illustrated by the radius 203 depicted in the end view of FIG. 4A. The gently converging relationship between the radial bearing surface 204 and the counter-surface 114 of the shaft serves to hydrodynamically wedge a lubricant film into the contact zone between the projection and the shaft in response to relative shaft rotation. This lubricant film physically separates the radial bearing surface 204 and the shaft, and thereby prevents the unlubricated friction-induced heat and torque that would be associated with dry rubbing type wear. The size, shape, and hydrodynamic inlet geometry of the radial bearing can take any one of many suitable forms that result in a gradually converging relationship with the shaft without departing from the spirit or scope of the present invention.

When the circular sealing element 105 is located within its seal groove and radially compressed between the rotary shaft and the radially outer wall of the seal groove, the radial compression of the seal causes the compressed material to be displaced axially, resulting in a length increase to the seal in the axial direction.

The coefficient of thermal expansion of the resilient sealing element is usually about 10 times greater than that of the housing and shaft, which are usually made from metal. The seal is often used in an elevated temperature environment, and also generates its own heat due to lubricant shear and asperity contact in the dynamic sealing interface. The seal experiences volumetric thermal expansion (which is about triple the linear coefficient of thermal expansion), but is confined radially and circumferentially, so most of the thermal expansion is relieved axially, resulting in a length increase to the seal in the axial direction.

The room temperature uncompressed overall length 205 of the seal and the overall length 206 of the gland are sized so that the installed, in-service length increase of the seal causes the resilient protuberances 200 to experience axial compression against the lubricant side gland wall 207 and causes the environmental end 109 of the seal to react against the environment side gland wall 120. Since the resilient protuberances 200 are of much lighter construction than the circular body of the seal, most of the above mentioned axial compression of the seal is absorbed by deflection of the resilient protuberances 200. The force resulting from axial compression of the resilient protuberances 200 forces the environmental end 109 of the seal into firm contact with the environmental gland wall 120 and supports the seal against (the previously described) circumferential compression induced buckling that could otherwise occur, and the abrupt exclusionary corner 116 is therefore held in the intended non-axially varying position and therefore can not generate a hydrodynamic wedging action with the environment in response to relative rotary motion, and thereby functions as intended to exclude particulate contaminants from the seal-to-shaft interface.

As mentioned previously, the seal shown in FIG. 4C is illustrated as it would be oriented when the pressure of the lubricant 106 and environment 107 are substantially the same, and the seal is being forced against the environmental gland wall by the axial compression of the resilient protuberances 200. Since the environment end 109 of the seal has the same shape as the environmental gland wall 120, and since the extrusion gap 208 between the housing and shaft is small, the seal as shown in FIGS. 4A, 4B and 4C is also well suited for service conditions where the lubricant pressure 106 is significantly greater than that of the environment, because the seal is well supported against the differential pressure by the gland wall, and the general shape of the seal is therefore not distorted by the differential pressure acting over it.

Spacing 205 is provided between the resilient protuberances 200 to serve several critical functions. The spacing 205 provides room for thermal expansion of the resilient protuberances 200, and provides room for material displaced circumferentially by axial compression of the resilient protuberances 200. If spacing 205 were not provided, the seal could overfill the gland, which would dramatically increase interfacial contact pressures, which would have a significant negative effect on seal performance. The spacing 205 between the resilient protuberances 200 also provides lubricant communication to the hydraulic inlet geometry 115 of the dynamic sealing lip 112. The spacing 205 between the resilient protuberances 200 is close enough so that the seal spans between the supporting protuberances do not deflect excessively when the seal is exposed to conditions where the pressure of the environment 107 is up to approximately 150 psi higher than the pressure of the lubricant 106; such excess deflection would cause axial variation in the position of corner 116 that could generate a hydrodynamic wedging action with the environment in response to relative rotary motion of the shaft. (150 psi is believed to be the upper bound of reverse pressure seen by a rotary seal that is mounted in a sliding piston to serve as a partitioning device between the lubricant and the environment in a drilling motor sealed bearing assembly.)

This invention has application where rotary shafts are sealed with respect to a housing with either the housing or the shaft being the rotary member. The projecting dynamic and static sealing lips can be on the inside and outside of the seal cross-sectional shape when the seal is compressed in the radial direction, with the dynamic lip being located on either the inner or the outer periphery. Alternately, the projecting dynamic and static sealing lips can be on opposite ends of the seal cross-sectional shape when the seal is compressed in an axial direction against relatively rotating planar countersurfaces.

DESCRIPTION OF ALTERNATIVE EMBODIMENTS

Figure 5A:
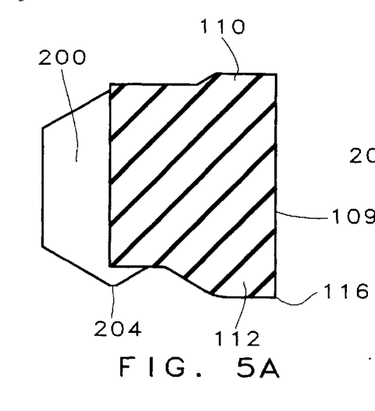
Figure 5B:
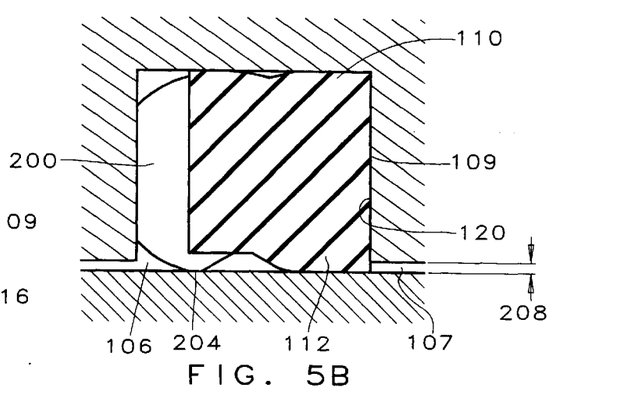

Referring now to FIGS. 5A and 5B a hydrodynamically lubricating generally circular sealing element representing an alternative embodiment of the present invention is shown in its uncompressed state in FIG. 5A, while in FIG. 5B the same generally circular sealing element is shown in its compressed state with a sealing gland of a housing and in interference sealing relation with a relatively rotatable surface. The generally circular sealing element is defined by a circular body of sealing material which defines an environment facing surface 109 which is exposed to the environment 107 and an oppositely facing surface which is exposed to the lubricant 106. The generally circular sealing element also defines a static sealing lip 110 and a dynamic sealing lip 112 which are preferably disposed in opposed relation to minimize the potential for twisting of the seal within the seal gland. On its lubricant side the dynamic sealing lip defines a non-circular geometry establishing a hydrodynamic inlet geometry which gradually converges with the relatively rotatable surface and establishes wedging of lubricant into the sealing interface between the dynamic sealing lip and the relatively rotatable surface and the lubricant is moved in a generally circular pattern responsive to relative rotation with the relatively rotatable surface. A plurality of resilient protuberances 200 project from the generally circular body of resilient material and are intended for spring-like compressive engagement with the lubricant side gland wall 207 of the circular seal installation groove or gland which is defined by the housing 102, thus maintaining the surface 109 positively seated against the environmental gland wall 120 of the housing 102. With the resilient protuberances 200 mechanically compressed against the lubricant side gland wall as shown in FIG. 5B, the resilient protuberances are deformed to the configuration shown in FIG. 5B without completely filling the space between the lubricant side surface of the sealing element and the lubricant side gland wall. This feature permits the seal groove or gland to accommodate significant thermal expansion of the sealing element without over-compressing the sealing element within the seal groove or over-compressing the dynamic sealing lip 112 against the relatively rotatable surface.

The resilient protuberances 200 also define bearing surfaces 204 which are provided for bearing contact with the relatively rotatable surface. The bearing surfaces 204 also assist in maintaining the abrupt circular exclusionary corner 116 in firm, environment excluding contact with the relatively rotatable surface. It should be borne in mind that the term "relatively rotatable surface", for purposes of this invention, may take the form of a generally cylindrical external surface such as the surface of a rotatable shaft, a generally cylindrical internal surface such as the internal surface of a rotating housing or tubular element or a rotatable wall surface such as a generally planar surface.

Although the dynamic sealing lip 112 and the static sealing lip 110 are shown in FIGS. 5A and 5B to be positioned at the extreme environmental end of the seal for favorable support should the seal be employed in high differential pressure lubricant retention service, such lip placement is not mandatory for low pressure differential service provided that the lips are positioned in an opposed manner so that radial compression of the seal under low pressure conditions does not induce twisting of the seal within its gland.

Figure 6:
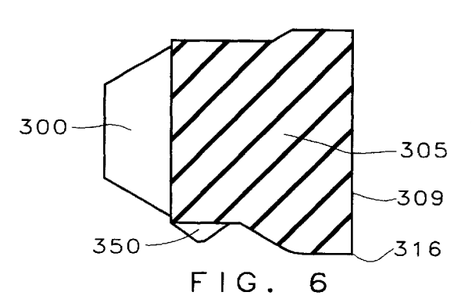

FIG. 6 illustrates an alternate embodiment of the invention in the uncompressed configuration wherein a hydrodynamic seal 305 is shown that is substantially identical to the embodiment shown in FIGS. 4A, 4B and 4C except that the dual functions of the resilient protuberances 200 shown in FIGS. 4A, 4B and 4C are instead performed independently by the separate resilient protuberances 300 and 350 of FIG. 6. A plurality of resilient protuberances 300 serve as compression springs in the axial direction to hold the abrupt circular corner 316 the intended non-axially varying position, and a plurality of resilient protuberances 350 serve as radial bearings in the radial direction to provide stability against counter-clockwise twisting of the seal within the gland, with the counter-clockwise direction being visualized with respect to FIG. 6.

Figure 7:
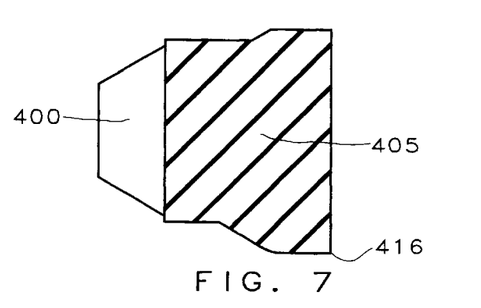

FIG. 7 illustrates an alternate embodiment of the invention in the uncompressed configuration wherein a hydrodynamic seal 405 is shown that is very similar to the embodiment shown in FIGS. 4A, 4B and 4C except that the resilient protuberances 400 only have one function; to serve as compression springs in the axial direction to hold the abrupt circular corner 416 in the intended non-axially varying position. The radial bearing function disclosed in FIGS. 4A, 4B, and 4C is not incorporated. The resilient protuberances 400 could be on the lubricant side, as shown, or on the environmental side, or in opposing positions on both the lubricant and the environmental sides, and still fulfill the function of holding the abrupt circular corner 416 in the intended non-axially varying position via axial compressive force.

Figure 8:
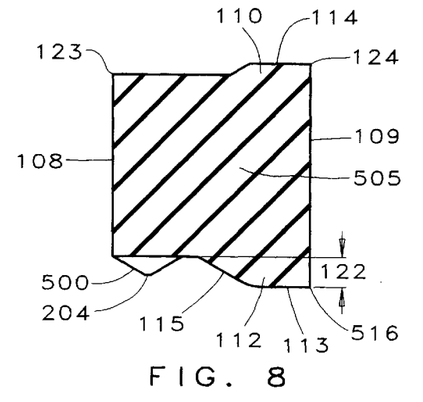

FIG. 8 illustrates an alternate embodiment of the invention in the uncompressed configuration wherein a hydrodynamic seal 505 is shown that is very similar to the embodiment shown in FIGS. 4A, 4B and 4C 5A and 5B except that the resilient protuberances 500 only have one function; to serve as radial bearings in the radial direction to provide stability against counter-clockwise twisting of the seal within the gland so that the exclusionary edge does not become tilted in service, with the counter-clockwise direction being visualized with respect to FIG. 8. The axial spring function disclosed in FIGS. 4A, 4B, and 4C is not incorporated.

The seal of FIG. 8 is a rotary seal which is adapted for establishing a sealing interface with a relatively rotatable surface, and adapted for defining a partition between a lubricant and an environment. The seal incorporates one or more bearing protuberances which may be integrally molded and hydrodynamically lubricated, and which help to minimize abrasive wear of the seal and relatively rotatable surface, resulting in substantially increased sealing life when the seal is used in abrasive environments. The seal is provided with an wavy, non-circular shape on the lubricant side of the dynamic sealing interface for the purpose of hydrodynamic lubrication, and is provided a circular, abrupt-cornered exclusionary shape on the environmental side of the dynamic sealing interface for engagement with the relatively rotatable surface for excluding contaminants.

The sealing element is generally ring shaped, and may be composed of any one of a number of suitable materials including elastomeric or rubber-like sealing material and various polymeric sealing materials, or any suitable combination thereof including a composite construction where one portion of the seal is of a different hardness than the other. The seal is adapted to be received within a circular seal groove defined by first and second spaced seal groove walls.

Referring now to FIG. 8, there is shown a fragmentary cross-sectional view of the seal in the uncompressed configuration. FIG. 8 may be interpreted by the standard conventions of sectional view orthographic drawing projection described in ANSI Y14.3-1975 section 3-4.2.1, which has been interpreted to mean that the circular seal body should be cross-hatched in sectional view, while the bearing 500 protuberances (described below) should be drawn in outline form without cross-hatching to avoid conveying a false impression of circumferential solidity.

At least a portion of the seal 505 of FIG. 8 may be located within a seal groove of a housing and compressed between a relatively rotatable surface and the seal groove to partition a lubricant and an environment, and to prevent intermixing of the lubricant and any contaminant matter present within the environment. From an overall orientation standpoint, the surface of seal 505 which is oriented toward the lubricant is surface or extremity 108 and the surface of the seal which is oriented toward the environment is surface or extremity 109.

A circumferential dynamic sealing lip 112 defines a dynamic sealing surface 113 for compressing against a relative rotatable surface. The circular seal groove is sized to hold the sealing element 505 against the relatively rotatable surface, thereby initiating a static seal with the seal groove and the relatively rotatable surface in the same manner as any conventional seal, such as an O-Ring. At least a portion of dynamic sealing lip 112 may be angulated with respect to said relatively rotatable surface and static sealing surface 114, as shown.

When relative rotation takes place, the interface becomes a dynamic sealing interface. The dynamic sealing surface 113 is provided with special geometry that promotes long seal life by hydrodynamically lubricating the dynamic interfacial zone, and by excluding environmental contaminates from the dynamic sealing interface. This special geometry consists of a wavy, non-circular hydrodynamic edge 115 on the lubricant side of the lip and a circular sharp edge 516 on the environmental side of the lip which provide the dynamic sealing surface 113 with a non-circular edge and a circular edge.

As relative rotation place, non-circular hydrodynamic edge 115 on the lubricant side of the lip, which has a gradually converging relationship with the relatively rotatable surface, generates a hydrodynamic wedging action that introduces a lubricant film between seal surface 113 and the counter-surface of the relatively rotatable surface per the teachings of U.S. Pat. No. 4,610,319. This lubricant film prevents the typical dry rubbing type wear associated with conventional non-hydrodynamic seals, and prolongs seal and mating relatively rotatable surface life. The hydrodynamic inlet geometry configuration can take any one of many suitable forms resulting in a gradually converging, non-circular shape at the lubricant side of the dynamic sealing interface without departing from the spirit or scope of the present invention. The lubricant is pumped into the dynamic sealing interface by a component of the rotational velocity.

The abrupt circular corner 516 of the environmental side of the seal is circular, and does not generate a hydrodynamic wedging action with the environment in response to rotation, and thereby functions to exclude contaminants from the dynamic interface per the teachings of U.S. Pat. No. 4,610,319.

Most or all of the seal surface from intersection 123 to intersection 124 may be brought into direct contact or close proximity with the mating counter-surface of the seal groove to provide seal stability. Such stabilization is important in implementations where a hydrostatic and/or mechanical force is applied to the environmental end 109 of the seal, such as during transient pressure fluctuations or when exclusionary edge 516 is required to actively scrape contaminants off of the relatively rotatable surface. The projection 122 of the dynamic sealing lip 112 is substantially greater than one-half of the nominal compression of the seal. A static sealing lip 110 may also be employed per the teachings of U.S. Pat. No. 5,230,520 if desired.

The principle geometric feature of the present invention is the presence of a plurality of bearing protuberances 500 located between surface or extremity 108 and surface or extremity 109 for contact with the relatively rotatable surface. The bearing protuberances 500 may be in compression against the relatively rotatable surface, providing stability against counter-clockwise twisting of the seal within the gland, with the counter-clockwise direction being visualized with respect to FIG. 8. This helps the abrupt circular exclusionary corner 516 to remain in firm contact with the relatively rotatable surface so that it can perform its intended exclusionary function.

The bearing protuberances may employ a geometry which provides a gently converging relationship with the relatively rotatable surface in the circumferential direction for hydrodynamic lubrication in response to relative rotation; an example of such a geometry is shown in FIG. 4A. The size, shape, and hydrodynamic inlet geometry of the bearing protuberances 500 can take any one of many suitable forms without departing from the spirit or scope of the present invention, such as the tapering shape shown in FIG. 8. As shown in conjunction with FIG. 4A, the bearing protuberances may be substantially equally spaced in circumferential distribution, and may be substantially identical, and may be oriented substantially perpendicular to the relatively rotatable surface and to the static and dynamic sealing surfaces.

Although the dynamic sealing lip is shown to be positioned at the extreme environmental end of the seal for favorable support should the seal be employed in high differential pressure lubricant retention service, such lip placement is not mandatory for low pressure differential service.

Circumferential spacing between the bearing protuberances 500 serves several critical functions. The spacing provides room for thermal expansion of the bearing protuberances 500, and provides room for material displaced circumferentially by compression of the bearing protuberances 500. If spacing were not provided, the seal might overfill the gland, which would dramatically increase interfacial contact pressures, which would have a significant negative effect on seal performance. The spacing also provides lubricant communication to the hydrodynamic inlet geometry of the dynamic sealing lip.

The seal of FIG. 8 has application where relatively rotatable surfaces are sealed with respect to housings with either being the rotary member. When the seal cross-sectional shape is compressed in the radial direction, the dynamic lip may be located on either the inner or the outer periphery. Alternately, the projecting dynamic sealing lip can be on an axial end of the seal cross-sectional shape when the seal is compressed in an axial direction against relatively rotating substantially planar counter-surfaces.

Figure 9:
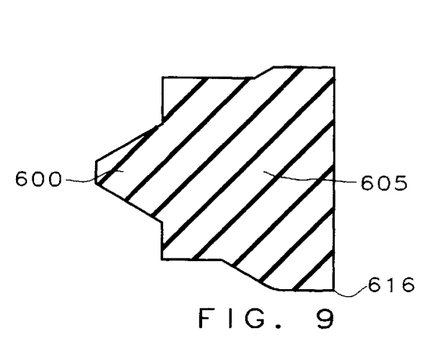

FIG. 9 illustrates an alternate embodiment of the invention in the uncompressed configuration wherein a hydrodynamic seal 605 is shown that, instead of a plurality of resilient protuberances, incorporates a single circular resilient protuberance 600 that serves as a compression spring in the axial direction to hold the abrupt circular corner 616 in the intended non-axially varying position. Space is provided on the ID and OD of circular resilient protuberance 600 for thermal expansion of circular resilient protuberance 600 and for material displaced by compression of circular resilient protuberance 600.

Figure 10:
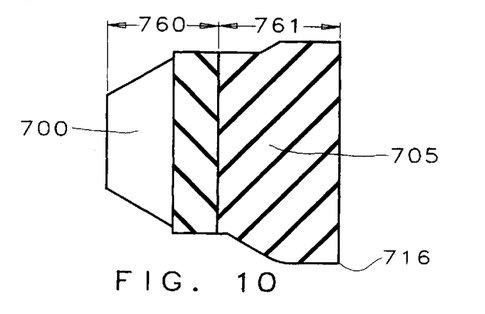

FIG. 10 illustrates an alternate embodiment of the invention in the uncompressed configuration wherein a hydrodynamic seal 705 is shown that is identical in external geometry to the embodiment shown in FIG. 7; the resilient protuberances 700 only have one function; to serve as compression springs in the axial direction to hold the abrupt circular corner 716 in the intended non-axially varying position. The radial bearing function disclosed in FIGS. 4A, 4B, and 4C is not incorporated. The difference between this embodiment and that of FIG. 7 is that this embodiment is a composite of two different resilient materials, rather than being made entirely from one material. The resilient material composing length 761 is a relatively hard material, which provides the required abrasion resistance for the rotary service. The resilient material composing length 760 is a relatively soft material that provides a lower axial spring force compared to a seal made entirely out of the harder material.

As will be readily apparent to those skilled in the art, the present invention may be produced in other specific forms without departing from its spirit or essential characteristics. The present embodiments are therefore to be considered as illustrative and not restrictive.

What is claimed is:

1. A skew and twist resistant rotary seal assembly comprising:
   (a) a structure having a circular seal groove having first and second spaced seal groove walls;
   (b) a relatively rotatable surface;
   (c) a circular body of sealing material being located within said circular seal groove and having a part thereof projecting from said circular seal groove;
   (d) at least one circular dynamic sealing projection extending from said circular body of sealing material and having sealing engagement with said relatively rotatable surface; and
   (e) a plurality of bearing elements projecting from said circular body of sealing material and being circumferentially distributed about said circular body of sealing material and having bearing engagement with said relatively rotatable surface.

2. The skew and twist resistant rotary seal assembly of claim 1, wherein:
   said plurality of bearing elements disposed in spaced relation with one another.

3. The skew and twist resistant rotary seal assembly of claim 1, wherein:
   said plurality of bearing elements each being of a hydrodynamic configuration defining a converging relationship with said relatively rotatable surface and providing for hydrodynamic lubrication.

4. The skew and twist resistant rotary seal assembly of claim 1, wherein said structure defines at least a portion of a lubricant chamber containing lubricant to which the relatively rotatable surface is exposed and said structure is exposed to an environment, said circular body of sealing material establishing sealing between said lubricant chamber and the environment, said circular dynamic sealing projection comprising:
   (a) said circular dynamic sealing projection being integral with said circular body of sealing material and defining a dynamic sealing surface having sealing engagement with said relatively rotatable surface;
   (b) hydrodynamic inlet geometry being defined by said circular dynamic sealing projection and being exposed to said lubricant chamber and providing hydrodynamic wedging of a lubricant film between said dynamic sealing surface and said relatively rotatable surface responsive to relative rotation therewith; and
   (c) a circular exclusionary geometry being defined by said circular dynamic sealing projection and being exposed to the environment for excluding environment intrusion between said dynamic sealing surface and said relatively rotatable surface.

5. The skew and twist resistant rotary seal assembly of claim 1, further comprising:
   a static sealing projection extending from said circular body of sealing material and being adapted for sealing engagement with said circular seal groove, said static sealing projection being located in generally opposed relation with said circular dynamic sealing projection.

6. A skew and twist resistant rotary seal, comprising:
   (a) a solid circular body of sealing material;
   (b) at least one dynamic sealing surface being defined by said solid circular body of sealing material and being oriented in a predetermined direction and having a lubricant-side edge and an environment-side edge;
   (c) at least one bearing projection extending from said solid circular body of sealing material and being oriented in generally the same direction as said predetermined direction; and (d) said solid circular body of sealing material defining at least a portion of a lubricant passage communicating past said at least one bearing projection to said lubricant-side edge of said dynamic sealing surface.

7. The skew and twist resistant rotary seal of claim 6, wherein said circular body of sealing material comprising:

(a) a circular sealing lip being integral with said circular body of sealing material and projecting therefrom and projecting generally in said predetermined direction, said circular sealing lip defining said dynamic sealing surface;

(b) an angulated non-circular hydrodynamic inlet geometry being defined by said circular sealing lip and providing hydrodynamic lubrication of said dynamic sealing surface; and (c) a circular exclusionary geometry being defined by said circular sealing lip.

8. The skew and twist resistant rotary seal of claim 6, further comprising:

said at least one bearing projection being a plurality of bearing projections being integral with said solid circular body of sealing material being disposed in spaced relation with one another.

9. The skew and twist resistant rotary seal of claim 6, comprising:

(a) a static sealing surface in generally opposed relation to said dynamic sealing surface; and (b) said at least one bearing projection being a plurality of bearing projections being substantially perpendicular to said static sealing surface.

10. A skew and twist resistant rotary compression type seal assembly, comprising:

(a) a housing exposed to a lubricant;

(b) a relatively rotatable surface being located proximate to said housing;

(c) a circular solid body of polymeric material being located by said housing;

(d) at least one dynamic sealing surface being defined by said circular solid body of polymeric material and being disposed in sealing engagement with said relatively rotatable surface, said dynamic sealing surface having a non-circular edge defining a hydrodynamic geometry for wedging of a lubricant film between said dynamic sealing surface and said relatively rotatable surface in response to relative rotation; and (e) a plurality of bearing elements projecting from said circular solid body of polymeric material and having bearing engagement with said relatively rotatable surface said bearing elements being disposed in spaced relation with one another.

11. The skew and twist resistant rotary compression type seal assembly of claim 10, wherein said dynamic sealing surface defining a circular exclusionary geometry.

12. A sealing assembly for establishing a sealed partition between an environment and a lubricant, comprising:

(a) a sealing element having:

(i) a generally ring shaped body defining a lubricant side extremity facing the lubricant and an environment side extremity facing the environment;

(ii) a dynamic sealing surface being defined by said generally ring shaped body and having a circular environment side edge facing the environment; and (iii) a plurality of bearing projections extending from said generally ring shaped body and being located between said environment side extremity and said lubricant side extremity and being circumferentially distributed on said generally ring shaped body;

(b) a relatively rotatable surface being in contacting engagement with said dynamic sealing surface and said bearing projections, said bearing projections and said dynamic sealing surface being oriented toward said relatively rotatable surface; and (c) said dynamic sealing surface having a non-circular lubricant side edge in contact with the lubricant and developing a hydrodynamic wedging action in response to relative rotation with the relatively rotatable surface which lubricates said dynamic sealing surface.

13. The sealing assembly of claim 12, wherein:

said relatively rotatable surface is of substantially planar configuration.

14. The sealing assembly of claim 12, wherein:

said relatively rotatable surface is of substantially cylindrical configuration.

15. The sealing assembly of claim 12, wherein:

said plurality of bearing projections being integral with said generally ring shaped body.

16. The sealing assembly of claim 12, wherein:

said non-circular lubricant side edge defining a gradually converging relationship with said relatively rotatable surface.

17. The sealing assembly of claim 12, comprising:

(a) a housing having a seal installation groove;

(b) at least a portion of said generally ring shaped body being positioned within said seal installation groove and having interference engagement with said relatively rotatable surface.

18. The sealing assembly of claim 12, comprising:

(a) said generally ring shaped body defining a projecting sealing lip; and (b) said projecting sealing lip defining said dynamic sealing surface, at least a portion of said projecting sealing lip being angulated with respect to said relatively rotatable surface.

19. The sealing assembly of claim 17, comprising:

(a) said seal installation groove having first and second gland walls;

(b) at least a portion of said lubricant side extremity being disposed in contacting relation with said first gland wall; and (c) at least a portion of said environment side extremity being disposed in contacting relation with said second gland wall.

20. A seal for establishing a sealed partition between an environment and a lubricant, comprising:

(a) a generally ring shaped body having a lubricant side extremity facing the lubricant and having an environment side extremity facing the environment;

(b) a dynamic sealing surface being defined by said generally ring shaped body and having a circular environment side edge for facing the environment;

(c) a static sealing surface being defined by said generally ring shaped body and being disposed in generally opposed relation with said dynamic sealing surface; and (d) a plurality of circumferentially distributed bearing projections being located on said generally ring shaped body between said environment side extremity and said lubricant side extremity and being disposed in substantially normal relation with said static sealing surface.

21. The seal of claim 20, wherein:

said static sealing surface being of substantially planar configuration.

22. The seal of claim 20, wherein:

said static sealing surface being of substantially cylindrical configuration.

23. The seal of claim 20, wherein:

said dynamic sealing surface being substantially perpendicular to said environment side extremity.

24. The seal of claim 20, wherein:

(a) a sealing lip projecting from said generally ring shaped body and defining said dynamic sealing surface; and (b) at least a portion of said projecting sealing lip being disposed in acute angular relation to said static sealing surface.

* * * * *